United States Patent
Al Hemairy et al.

(10) Patent No.: US 12,348,634 B1
(45) Date of Patent: Jul. 1, 2025

(54) FRAMEWORK FOR STORAGE AND VERIFICATION OF ACADEMIC CREDENTIALS ON BLOCKCHAIN TECHNOLOGY

(71) Applicant: University of Sharjah, Contact: Dr. Mohamed Al Hemairy, Sharjah (AE)

(72) Inventors: Mohamed Al Hemairy, Sharjah (AE); Manar Abu Talib, Sharjah (AE); Ather Khalil, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 18/397,451

(22) Filed: Dec. 27, 2023

(51) Int. Cl.
| | |
|---|---|
| *H04L 9/30* | (2006.01) |
| *H04L 9/06* | (2006.01) |
| *H04L 9/08* | (2006.01) |
| *H04L 9/32* | (2006.01) |

(52) U.S. Cl.
CPC .......... *H04L 9/3066* (2013.01); *H04L 9/0631* (2013.01); *H04L 9/088* (2013.01); *H04L 9/3247* (2013.01)

(58) Field of Classification Search
CPC ... H04L 9/3247; H04L 9/3066; H04L 9/0861; H04L 9/088; H04L 9/0631
See application file for complete search history.

(56) References Cited

U.S. PATENT DOCUMENTS

| | | | | |
|---|---|---|---|---|
| 2004/0221158 A1* | 11/2004 | Olkin | ..................... | H04L 9/3236 713/170 |
| 2005/0229011 A1* | 10/2005 | Ebringer | ................ | G06F 21/445 713/189 |
| 2013/0046972 A1* | 2/2013 | Campagna | ............ | H04L 9/3263 713/156 |
| 2017/0026355 A1* | 1/2017 | Mathaiyan | .......... | H04L 63/0428 |
| 2017/0099188 A1* | 4/2017 | Chang | .................. | H04L 12/4633 |
| 2019/0312730 A1* | 10/2019 | Engan | .................... | H04L 63/126 |
| 2021/0264520 A1* | 8/2021 | Cummings | ............ | G06Q 40/12 |
| 2021/0281395 A1* | 9/2021 | Narayanaswami | ... | H04L 9/3247 |
| 2022/0150072 A1* | 5/2022 | Jacob | ....................... | G06F 21/64 |
| 2023/0275773 A1* | 8/2023 | Jacob | ..................... | H04L 9/3247 713/193 |
| 2024/0152284 A1* | 5/2024 | Lee | ........................ | G06F 3/0622 |

* cited by examiner

*Primary Examiner* — Dao Q Ho
(74) *Attorney, Agent, or Firm* — MH2 Technology Law Group, LLP

(57) ABSTRACT

There is disclosed a method of authenticating credential data signed on a blockchain-based validation and authentication platform, the method being based a computer readable medium storing machine-readable instructions which when executed by the processor cause the processor to generate an ECDSA (Elliptic Curve Digital Signature) algorithm-based digital signature using a private key from an issuer, and authenticate the signed credential data via the ECDSA algorithm directly using a corresponding public key. As another aspect, a system for validating/authenticating academic credentials and facilitating equivalency between different credentials is disclosed comprising a blockchain for storing signed credential data and for processing transactions, a database for storing non-transactional data, a cryptographic algorithm for signing the credential data and for subsequently verifying the generated digital signatures; and a military grade encryption algorithm for encrypting the data put on blockchain.

18 Claims, 5 Drawing Sheets

| | |
|---|---|
| R | ee63186fed7e396cc2da8b37cb79a7bd5a40b5e0e3e7b172c2194a097a543fac |
| S | 6b2dd761a38af3161f5728b354d7554bdda0be68314e0989b3d9224f2b775741 |
| Signing timestamp | 1655121120000 |

Fig.1

```
                DIGITAL SIGNATURE ALGORITHM
FUNCTION signWithECDSA:
   READ PRIV_KEY
   IF length of PRIV_KEY == 52 THEN
      get on-chain credential data
      decrypt on-chain data
      IF PRIV_KEY matches with correct corresponding PUB_KEY key THEN
         sign credential with PRIV_KEY
         PRINT DIGITAL_SIGNATURE
      ELSE
         PRINT "INVALID SIGNING KEY"
   ELSE
      PRINT "INVALID KEY LENGTH"
```

Fig.2

```
VERIFY DIGITAL SIGNATURE ALGORITHM

FUNCTION verifyECDSA:
  READ DIGITAL_SIGNATURE
  get on-chain credential data
  decrypt on-chain data
  hash on-chain data
  SET verification to check DIGITAL_SIGNATURE using PUBLIC_KEY & HASH
  IF verification is TRUE THEN
     PRINT "Digital Signature Verified"
  ELSE
     PRINT "INVALID DIGITAL SIGNATURE"
```

FRAMEWORK FOR STORAGE AND VERIFICATION OF ACADEMIC CREDENTIALS ON BLOCKCHAIN TECHNOLOGY

FIELD OF THE INVENTION

The invention relates to an improved academic credential management system through the integration of Blockchain technology, Digital Signatures and the Elliptic Curve Digital Signature Algorithm (ECDSA) offering enhanced security, integrity, and trustworthiness in credential authentication, validation, accreditation, and equivalency of certification.

BACKGROUND OF THE INVENTION

Background description includes information that will be useful in understanding the present invention. It is not an admission that any of the information provided herein is prior art or relevant to the presently claimed invention, or that any publication specifically or implicitly referenced is prior art.

Academic credentials play an immensely significant role in the career of a person and in the progress of society. The system in place currently used for the issuance, storage & sharing of academic credentials is quite inefficient in its operations, due to being paper based in large. There is also widespread fraud committed every year in terms of academic credentials, ranging from diploma mills to plain forgery. There presents a need for a total digital transformation in this field from the traditional centralized credential management systems, which ensures complete independent authenticity of credentials that could be proven in a foolproof manner.

Blockchain technology promises to alleviate the above identified problems by ensuring complete transparency & verifiable proofs of ownership using decentralized storage of credentials, encrypted Digital Signatures, in-corruptibility, anonymity, complete auditability, and the capacity to run smart contracts. The blockchain technology has vast applications in different sectors and has been used in educational sector as well in assessing the students, issuing certified digital documents/certificates, validating academic credentials, keeping academic records secure and accessible, monetary transactions, etc.

There has been many studies and projects conducted recently regarding application of Blockchain in academic sector. A recent study looked at the introduction of micro-credentials in the conventional education system to enhance authenticity through the provision of certified digital documents, such as digital badges (DBs) in the context of enabling multimedia classrooms (MCs). Blockcerts, an initiative launched by the MIT Media Lab, allows for Open Badges compliant certificates to be issued on the Bitcoin blockchain. But the students have to maintain custody of their own cryptographic keys that were used for digitally signing the certificates and Blockcerts has no separate validity check service. Therefore, a certificate may be spoofed. Furthermore, it stores credential revocation information on a centralized database which is a vulnerable source as it can be hacked. Similarly, there are many Blockchain systems introduced for the purpose like Hyperledger Ledger Fabric, OpenBadges, Accredible, UNIC, UZHBC, Ethereum etc. The systems described above have loopholes and lacking of their own, such as: they are confined in scope as they are tied to their own institutes and to use many of them, registration is mandatory. Many of the solutions discussed above do not take into account the accreditation authorities. This serious drawback leaves the solutions open to the problem of university staff forging the academic data and the phenomena of diploma mills. There is also concern about privacy of a learner's academic & personal data and the possible problem of scalability. Many systems solely depend on individual transactions for each student, which result in heavier transaction costs and lead to blockchain-bloat whenever a public Blockchain is used. Certificate revocation functionality is implemented by very few systems only.

But most of the Blockchain platforms currently in use, provide platform managed keys. Key management functionality refers to the feature of storing & managing user keys used for digital signatures. If a platform is storing keys on their side on a database, it presents significant liability on their part in terms of security & privacy of these keys. If the platform faces a situation where the digital signature keys are deemed compromised i.e., stolen or erased, the sole responsibility might expose the platform stakeholders to lawsuits & unavoidable downfall of the solution. The best approach is to allow the user to have custody of their private keys & input them whenever a signing operation is to be performed. This approach offers better privacy, complete isolation of keys from system, less liability on the platform to secure the keys, and no hassle of storing & securing keys.

SUMMARY

A first aspect of the present disclosure provides a method of authenticating credential data signed on a blockchain-based validation and authentication platform, the method being based a computer readable medium storing machine-readable instructions which when executed by the processor cause the processor to generate an ECDSA (Elliptic Curve Digital Signature) algorithm-based digital signature using a private key from an issuer, and authenticate the signed credential data via the ECDSA algorithm directly using a corresponding public key.

In another embodiment of the present invention, the method further comprises storing the credentials securely by employing a classification of data, and storage of data on a Blockchain and a database, digitally signing the credentials using cryptographic algorithms wherein a unique digital signature is generated for each credential, for enabling its authentication and integrity verification, verifying the validity and accuracy of credentials by cross-referencing them with said generated digital signatures and related metadata using sophisticated algorithms and the Blockchain, and attesting the credentials by trusted third-party entities and authoritative entities, vouching for the accuracy and trustworthiness of the credentials.

In another embodiment of the present invention, the classification of credential data comprises classifying data into "Off-Chain" and "On-Chain" data wherein Off-chain data is non-transactional information related to credentials, courses or students and On-Chain data is in the form of signed transactions data, containing critical and sensitive information about issued or signed credentials by stakeholder parties.

In another embodiment of the present invention, storing the credentials comprises storing the Off-chain data in a database and storing the On-chain data in the form of signed transactions, on the Blockchain configured such that the On-chain data is tamper-proof and verifiable.

In another embodiment of the present invention, the digital signature uses the private key to sign the hash of the data and uses the public key to verify the digital signature in combination with the hash of the data which was signed.

In another embodiment of the present invention, the ECDSA algorithm is implemented for signing credential data by the issuer or issuing party thereby embedding the digital signature with the credential data.

In another embodiment of the present invention, the embedded digital signature remains alongside the credential data in JSON format.

In another embodiment of the present invention, the generated private key and public key pair is non-expiring and the public key is embedded in the credential data rather than being passed to a verifier or third-party.

In another embodiment of the present invention, the digital signature is mathematically derived from the hash of data to be signed and the private key and gives a resultant of two numbers, a "r" and a "s" value along with a timestamp.

In another embodiment of the present invention, the On-chain data is encrypted using an Advanced Encryption Standard (AES) algorithm whereby the On-chain data is masked into a pseudo-random string and is configured to be decrypted by means of the private key that is used in signing the digital signature.

In another embodiment of the present invention, the Advanced Encryption Standard (AES) algorithm is a military grade AES encryption algorithm.

As another aspect of the present invention is disclosed one or more computer-readable media comprising instructions that cause a computer device, in response to execution of the instructions by one or more processors of the computer device, to operate a blockchain-based validation and authentication platform to generate an ECDSA (Elliptic Curve Digital Signature) algorithm-based digital signature using a private key from an issuer, and authenticate signed credential data via the ECDSA algorithm directly using a corresponding public key.

In another embodiment of the present invention, the digital signature uses the private key to sign the hash of the data and uses the public key to verify the digital signature in combination with the hash of the data which was signed.

In another embodiment of the present invention, the ECDSA algorithm is implemented for signing credential data by the issuer or issuing party thereby embedding the digital signature with the credential data.

As another aspect of the present invention is disclosed a system for validating/authenticating academic credentials and facilitating equivalency between different credentials comprising a blockchain for storing signed credential data and for processing transactions, a database for storing non-transactional data, a cryptographic algorithm for signing the credential data and for subsequently verifying the generated digital signatures; and a military grade encryption algorithm for encrypting the data put on blockchain.

In another embodiment of the present invention, the blockchain is a Bitcoin Satoshi Vision (BSV) blockchain.

In another embodiment of the present invention, the cryptographic algorithm is an Elliptic Curve cryptography (ECC)-based Elliptic Curve Digital Signature Algorithm (ECDSA).

In another embodiment of the present invention, the military grade encryption algorithm is an Advanced Encryption Standard (AES) algorithm.

BRIEF DESCRIPTION OF THE DRAWINGS

The manner in which the above-recited features of the present disclosure are understood in detail, a more particular description of the present disclosure, briefly summarized above, may be had by reference to embodiments, some of which are illustrated in the appended drawings. It is to be noted, however, that the appended drawings illustrate only embodiments of the present disclosure and are therefore not to be considered limiting of its scope, for the present disclosure may admit to other equally effective embodiments.

FIG. 1 shows the Digital Signature Values 'r' & 's' generated using the ECDSA algorithm, with the signature timestamp.

FIG. 2 presents the Private Key pseudocode of an academic credential being signed using the ECDSA algorithm.

Figures 3, 4:
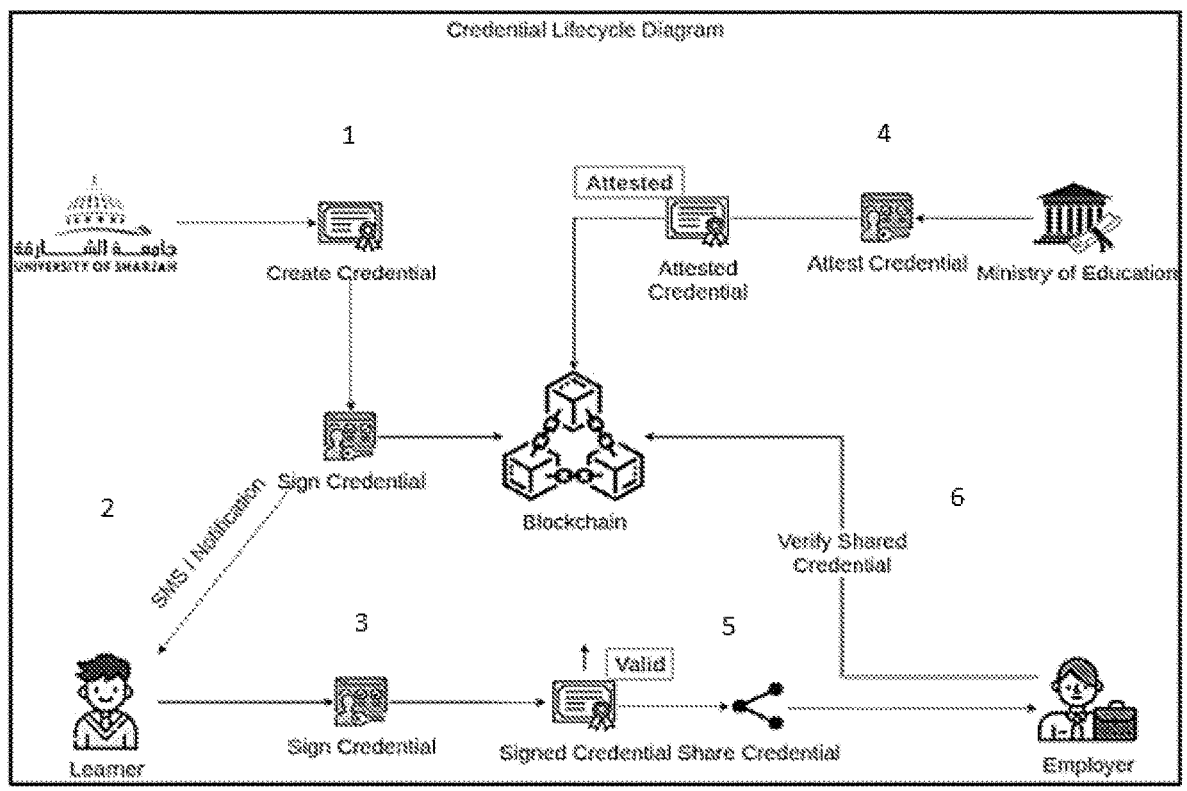
FIG. 3 shows the Verification Pseudocode to verify the digital signature of any party using the ECDSA verification algorithm.
FIG. 4 shows in detail the process flow of the credential as a Credential Lifecycle Diagram as proposed in the solution framework.

The foregoing and other objects, features and advantages of the present disclosure, as well as the present disclosure itself, will be more fully understood from the following description of embodiments, when read together with the accompanying drawings.

DETAILED DESCRIPTION

In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment." "an embodiment." "embodiments." or "one or more embodiments" are intended to indicate that a particular feature, structure, or characteristic described in connection with the embodiment is included in at least one embodiment of the present disclosure.

Academic credentials play an immensely important role in an individual's career and in the progress of society. The current system for issuing, storing and sharing academic credentials is quite inefficient in its operation, being largely paper based. There is also widespread fraud in academic credentials every year, ranging from diploma mills to outright forgery. There is a need for a complete digital transformation in this area, which will ensure complete independent authenticity of credentials, which can be proven in a fool proof manner. Blockchain technology promises to alleviate the above problems by ensuring complete transparency and verifiable proof of ownership through decentralised storage of credentials and public key cryptography (PKC) in the form of digital signatures. The present invention implements the proposed solution by using an ECDSA algorithm to sign the accreditation of institute by a governing body, sign the academic credentials by the issuing party, sign the issued credentials by the learner and then sign the credentials by the governing body. The learner may then share the signed credential with any third party, such as a potential employer. The ECDSA algorithm then authenticates the credential by programmatically verifying the signature proof by any party using the corresponding Public Key without going through tedious channels.

The disclosed solution also incorporates an attestation mechanism, which involves the validation and endorsement of credentials by trusted third-party entities. This process establishes an additional layer of trust and credibility by involving reputable organizations or individuals who can vouch for the authenticity and accuracy of the credentials. The attestation process ensures that the credentials are not only verified but also supported by authoritative entities, further bolstering their trustworthiness. Governing bodies like the Ministry of Education, can sign the credentials to provide additional endorsements, enhancing their credibility.

In an embodiment of the present invention, the present invention relates to an improved blockchain-based framework and platform and a method, developed for validating, authenticating, or establishing equivalence of academic certification and institution's accreditation using the improved blockchain-based framework and platform. By leveraging the capabilities of Blockchain, the framework enhances the security, integrity, and trustworthiness of credential management systems and enables the establishment of equivalency between different credentials. The proposed method uses the cryptographic Digital Signature Algorithm known as the Elliptic Curve Digital Signature Algorithm (ECDSA) algorithm to (i) sign the accreditation of institute by a governing body, such as The Ministry of Education (MOE) (ii) sign the academic credentials by the issuing party (iii) sign the issued credentials by the learner to claim iv) sign the credentials by some governing body like the MOE. The signed credential can be shared with any third party, who can then verify the signature proof programmatically using the corresponding Public Key. The ECDSA algorithm thus, helps in authenticating the credential without having to go through tedious channels. The method also proposes a framework entailing a collection of self-contained microservices and components based on a modular design philosophy, where each microservice and component performs a specific task within the overarching credential management process. These discrete units operate independently but maintain loose coordination to facilitate seamless interoperability and information exchange between disparate systems. This enables the stakeholders to compare and match diverse sets of credentials based on predetermined equivalence criteria, thereby enhancing the overall efficiency and effectiveness of the credential management process.

The method further comprises masking all the on-chain data, which is the critical data regarding the credential being issued or signed by the stakeholder parties that goes on the Blockchain, using Advanced Encryption Standard (AES) encryption. The masked data can only be decrypted by means of private key that was used to encrypt the data. By this means, the highly sensitive on-chain data is secured and prevented from unauthorized access on the public Blockchain, maintaining learner and issuer privacy.

The following is a detailed description of embodiments of the present disclosure. The method of validating/authenticating academic credentials and facilitating equivalency between different credentials comprises of:

i) storing the credentials securely and efficiently, by employing classification of data, and storage on a Blockchain and a database,
ii) digitally signing the credentials using advanced cryptographic algorithms wherein a unique digital signature is generated for each credential, enabling its authentication and integrity verification,
iii) verifying the validity and accuracy of credentials by cross-referencing them with the corresponding digital signatures and other relevant metadata using sophisticated algorithms and transparency nature of the Blockchain,
iv) attesting the credentials by trusted third-party entities and authoritative entities, who can vouch for the accuracy and trustworthiness of the credentials.

In accordance with the present invention, secure storage of the credentials comprises classifying credential data into two groups: "Off-Chain" & "On-Chain" data and making use of a database along with Blockchain. This allows for efficient data storage without burdening Blockchain transaction sizes.

Off-chain data resides in a database, encompassing non-transactional information like metadata about courses, credentials, or students. It poses no threat to credential integrity in case of a breach/compromise of off-chain data. On the other hand, On-chain data goes on the Blockchain in the form of signed transactions and contains critical and highly sensitive information about issued or signed credentials by the stakeholder parties. The credential information is transformed into a tamper-resistant format by utilizing cryptographic techniques and stored on Blockchain. The leveraged immutability and transparency of the Blockchain ensures that the stored data remains tamper-proof and verifiable by stakeholders. On-chain data is classified to be as lean as possible to save on transaction costs & payload size.

Another aspect of the invention is to digitally sign the credentials to be issued. Credentials are digitally signed using the cryptographic algorithm known as the Elliptic Curve Digital Signature Algorithm (ECDSA) to establish authenticity, which are then subsequently verified employing the same algorithm. ECDSA, a variant of the Digital Signature Algorithm (DSA), employs cryptographic keys derived from Elliptic Curve Cryptography (ECC). This algorithm utilizes a "private key" to sign the cryptographic hash of data, while the subsequent verification process combines the corresponding "public key" and the signed data hash to verify the digital signature. ECDSA's adoption ensures secure, compact, and computationally efficient digital signatures. The algorithm's efficiency arises from elliptic curve mathematics, providing resistance against computational attacks, including brute-force and factorization-based attacks.

In an embodiment of the invention, the invention adopts Elliptic Curve Cryptography (ECC)-based ECDSA algorithm with significantly smaller key sizes in resource-constrained environments where computational power and storage capacity may be limited so as to provide secure and compact digital signatures. The individual elements that comprise the ECDSA algorithm in the process of digital signing and verification process are the private key, public key, cryptographic hash function. The utilization of ECDSA algorithm, stemmed from Elliptic Curve Cryptography (ECC), in short, offers advantages in terms of efficiency and security, a suitable choice for resource-constrained environments, robustness against computational attacks and ability to provide secure and compact digital signatures. Table I provides a visual representation of the ECDSA algorithm's constituents, facilitating a comprehensive understanding of its operation within the context of the disclosure.

TABLE I

ECDSA SIGNATURE PARAMETERS (WIKIPEDIA, 2022)

| Parameter | Description |
| --- | --- |
| CURVE | the elliptic curve field and equation used |
| G | elliptic curve base point, a point on the curve that generates a subgroup of large prime order n |
| n | integer order of G, means that n × G = O, where O is the identity element. |
| $d_A$ | the private key (randomly selected) |
| $Q_A$ | the public key $d_A$ × (calculated by elliptic curve) |
| m | the message to send |

In the present disclosure, the ECDSA algorithm utilizes a "private key" and a "public key" in its operation. As known to a person skilled in the art, a private key is a secret string of characters that is known by the one who generates it. A private key is a pseudo-randomly generated string and is a single unsigned 256-bit integer (32 bytes), used in making Bitcoin transactions. The public key is a string that is calculated from the private key, it does not need to be kept a secret. The public key can be generated from a private key, but not the other way around. In Bitcoin protocol, public keys are compressed or uncompressed. Compression techniques enable efficient public key representation. Compressed public keys consist of 33 bytes, with a prefix of 0x02 or 0x03, and a 256-bit integer 'x'. The older uncompressed keys consist of 65 bytes, with a constant prefix (0x04), followed by two 256-bit integers 'x' and 'y' (2*32 bytes). The prefix of a compressed key enables to derive the 'y' value from the 'x' value.

In the present disclosure, the method comprises using ECDSA algorithm for encrypting credential data. This algorithm operates by utilizing a "private key" to sign the cryptographic hash of the data, while during the verification process, the "public key" generated from the corresponding private key, is combined with the hash of the signed data to determine if a signature is true. This is done without needing to reveal the private key. The algorithm is used for signing the academic credential by the issuing party thereby embedding the signature with the credential data and not just encrypting it. The ECDSA Digital Signature is not embedded on the document as an image or PDF but is generated from a private key by the issuer and remains alongside the credential data in JSON format. The private key is used here for generating an ECDSA Digital Signature, not for encryption. The private and public keypair is non-expiring and the public key is not passed to the verifier, but it is already embedded in the credential JSON data. The user has the custody of their private keys & input them whenever a signing operation is to be performed. Such user managed keys offer better privacy, security, complete isolation of the keys from the system, and less liability on the platform to store and secure the keys.

Another aspect of the present disclosure is to verify the validity and accuracy of credentials by cross-referencing them with the corresponding digital signatures and other relevant metadata using sophisticated algorithms and the transparency nature of the Blockchain. A digital signature is a set of strings that proves a signing operation. The signature is mathematically derived from the hash of data to be signed & the private key. As per the invention described, generating a digital signature using the ECDSA algorithm gives the resultant of two numbers, which are known as the 'r' & 's' values, along with a signature timestamp, aiding a later conversion to different formats. The method for verification requires that the signature, public key and hash of the data be fed to the ECDSA algorithm, and it mathematically proves the digital signature without knowledge of the private key. The method outputs the result as either "true" or "false" after running the ECDSA algorithm.

In one embodiment of the invention, the 'r' & 's' values of the digital signature generated after using the ECDSA algorithm along with the signature timestamp, which is not generated as a result of th ECDSA algorithm, but is part of the credential. The timestamp can be in 'Unix' format, which can then later be converted to UTC or other formats as per requirement. The method for verification requires that the signature, public key & hash of the data be provided. The method outputs the result as either "true" or "false" after running the ECDSA algorithm. FIG. 1 shows the 'r' & 's' values of the digital signature generated using the ECDSA algorithm, with the signature timestamp in 'Unix' format.

The disclosure also describes utilizes the Advanced Encryption Standard (AES) algorithm to secure on-chain data, replacing the DES algorithm. Since the on-chain data of the academic credential contains sensitive information that the learner or institute may not want to be disclosed to the public and Blockchain is a public ledger that is accessible to everyone in the world, AES cryptographic technique masks on-chain data into a pseudo-random string, preventing unauthorized access on the public Blockchain. The pseudo-random string can only be decrypted by means of private key that was used to encrypt the data, thereby rendering the privacy & the confidentiality of the stakeholder. In an embodiment of the invention, the on-chain data is encrypted using the military grade AES encryption algorithm, thereby preventing undesired access to information by unauthorized parties. This comprehensive verification mechanism ensures that only authentic and unaltered credentials are considered valid within the system. FIG. 2 presents the Private Key pseudocode of an academic credential being signed using the ECDSA algorithm. FIG. 3 shows the Verification Pseudocode to verify the digital signature of any party simply by the means of using ECDSA verification algorithm.

FIG. 4 depicts in detail the process flow of the credential as a lifecycle as proposed in the solution framework. The steps that need to be followed for the academic credential to be issued and fully authenticated, involving the learner and the institute for example, the University of Sharjah and attestation by a competent authority for example, the Ministry of Education (MOE) comprises the following steps, as shown in FIG. 4: Step 1. The Institute creates & signs the credential. Step 2. The notification is sent to the learner. Step 3. The learner signs the credential. Step 4. The Ministry of Education then signs the credential as an attestation. Step 5. The student shares the credential with a third-party such as an employer. Step 6. The employer can verify the authenticity of the credential by digital signatures of the signatories.

Figure 5:
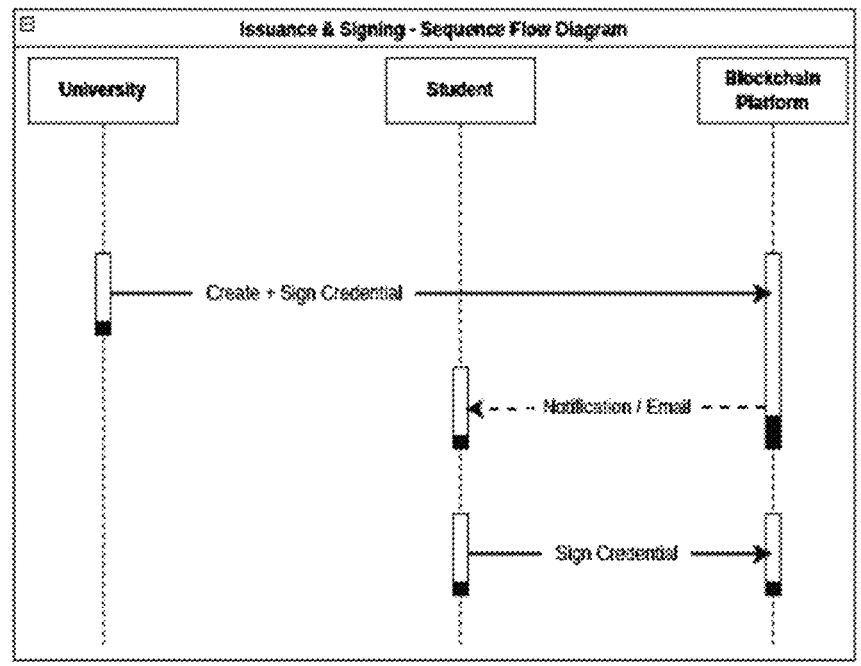
FIG. 5 presents a sequence flow of the credential issuance & signing procedure in the framework.
Figure 6:
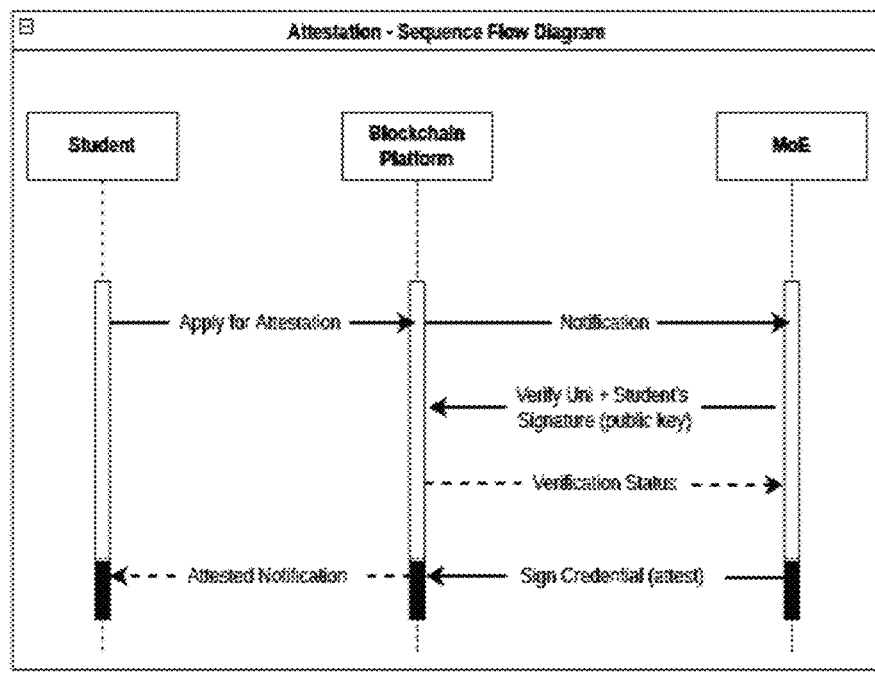
FIG. 6 elaborates the sequence of flow for the credential attestation process in the proposed framework.
Figure 7:
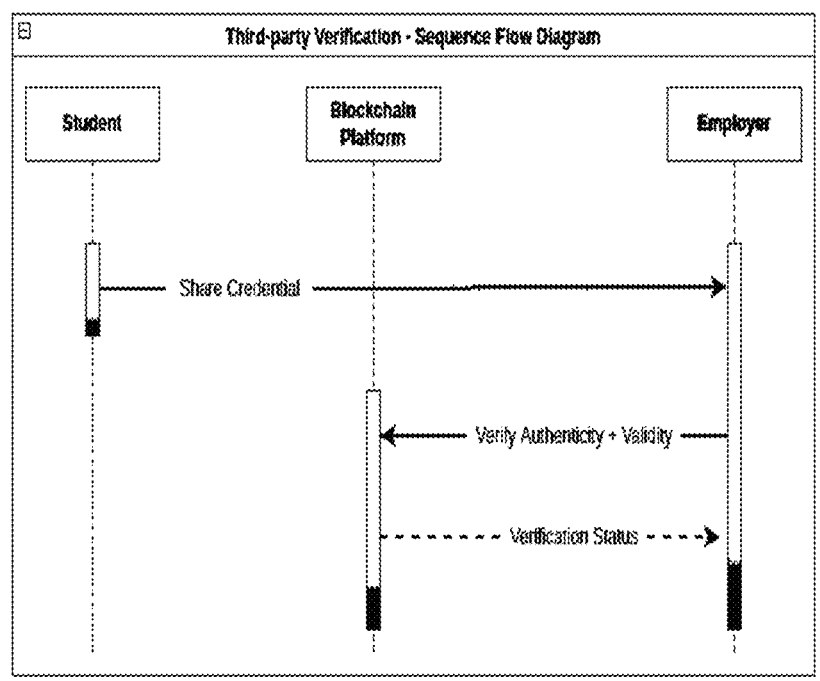
FIG. 7 elaborates the sequence flow of activities to share the credential by the learner to any third-party & the subsequent verification of the shared credential using the digital signature by that third-party.
Figure 8:
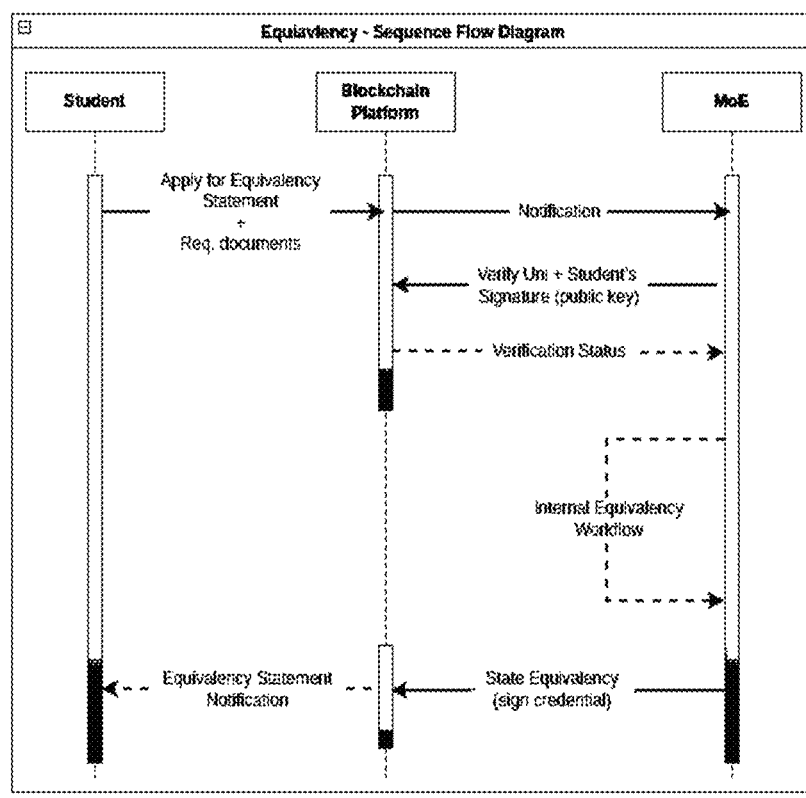
FIG. 8 elaborates the sequence flow of activities to perform the equivalency of the credentials using the framework.

FIG. 5 presents a sequence flow of the credential issuance & signing procedure in the framework. FIG. 6 elaborates the sequence of flow for the attestation process in the proposed framework. FIG. 7 describes the sequence of activities to share the credential by the learner to any third-party & the subsequent verification of the shared credential using the digital signature by that third-party. FIG. 8 elaborates the sequence flow of activities to perform the equivalency of the credentials using the framework. The student initiates the process by submitting the application to the desired authority for example, the MOE, along with the required documents necessary for the equivalency to be granted by the authority. The process is streamlined greatly using the proposed framework. The MOE can sign the credential using ECDSA digital signatures as a grant of equivalency, the digital signatures can serve as the authentic proof of equivalency provided by the authority.

The present disclosure also describes in detail a web-based platform/application for validating/authenticating or establishing equivalency of academic certification and institution's accreditation using leveraged Blockchain, ECDSA, and AES encryption. The web application is developed using the MERN stack, comprising MongoDB, Express, React, and Node.js. MongoDB, a NoSQL document-based database, provides a flexible and scalable data storage and retrieval. Its document-oriented nature allows for easy representation and manipulation of complex data structures. Node.js, serving as the premier JavaScript runtime, is the back-end web server for hosting and executing the application's APIs. Its event-driven architecture and non-blocking I/O operations enable Node.js to efficiently handle concurrent requests. Node.js leverages the V8 JavaScript engine, resulting in high-performance execution of server-side code. The application utilizes Express.js, a widely adopted web framework for Node.js to facilitate the development of APIs. Express.js simplifies the creation of robust and efficient API endpoints by providing a multitude of middleware and routing capabilities. Its seamless integration with Node.js builds scalable and high-performing web services. React.js, a powerful front-end JavaScript framework, is employed to construct a dynamic user interface (UI) that seamlessly interacts with the application's APIs. React.js facilitates the creation of reusable UI components, enabling developers to efficiently manage and update the application's state. React.js optimizes the rendering process and enhances the overall user experience with its declarative syntax and efficient virtual DOM diffing algorithm. By harnessing MongoDB, Express, React, and Node.js, the web application achieves a comprehensive technological foundation. The MERN stack's flexibility, scalability, and ease of development enables the feature-rich, and responsive application to meet the modern web development demands.

The web-based platform/application is not monolithic in nature. It is based on micro-services and does not need to be installed on the user's machine. Each task e.g., credential creation, signing and verification are performed by a separate Node.js service that are communicated via an API by the application front-end.

The present disclosure discloses that the invention adopts a modular architecture with autonomous microservices and components operating independently but maintaining loose coordination. Each microservice performs a specific task within the overarching credential management process, ensuring efficient and seamless execution of operations.

In one embodiment of the invention, the microservices architecture proposed for the development & deployment of the application framework can be expanded to multiple replicas of one service, orchestrated to balance the load using tools such as Kubernetes, which can orchestrate traffic to multiple replicas of services deployed as containers.

In one embodiment of the invention, the framework for storing, signing & verifying the academic credentials is designed using the modern MERN stack and the Blockchain employed is a BSV Blockchain. The BSV Blockchain is chosen for the framework because of the sheer number of transactions that can be processed by the network per second & lowest transaction costs incurred per transaction. The performance metrics of BSV Blockchain affirms an overall superiority of the framework & allows for extreme scalability. An extensive performance comparison review of public Blockchains was conducted after the development phase of the application. The parameters for performance analysis of the system are Transaction Throughput (TPS) which is known as the number of transactions per second the Blockchain is able to sustain, and Transaction Cost. The results are as shown below in Table II.

TABLE II

| PERFORMANCE COMPARISON OF PUBLIC BLOCKCHAINS | | | | | | |
|---|---|---|---|---|---|---|
| Blockchain | Type | Consensus Model | Data Immutability | Smart Contracts | Throughput Capacity | Latency |
| BSV | Public | PoW | Cryptographically + Economically Secured | Bitcoin Script | 50,000 TPS* | 1-3 sec |
| Bitcoin | Public | PoW | Cryptographically + Economically Secured | Not available | 7 TPS | 10 min |
| Ethereum | Public | PoS | Economically Secured | Solidity | 30 TPS | 2-6 min |
| Cardano | Public | PoS | Economically Secured | Under testing | 257 TPS | ~6 min |
| Polkadot | Public | NPoS | Economically Secured | No native support (supported by Parachains) | ~1000 TPS | N/A |
| Stellar | Public | SCP | Economically Secured | JavaScript | ~250 TPS | 2-5 sec |

*TPS = Transactions Per Second, PoW = Proof of Work, PoS = Proof of Stake, NPoS = Nominated Proof of Stake, SCP = Stellar Consensus Protocol, Raft = consensus algorithm Comparing the performance metrics of different blockchains, Table II demonstrates that the BSV Blockchain exhibits the highest transaction throughput capacity of 50,000 TPS and the lowest transaction latency, with 1-3 seconds per transaction, among public blockchains. In contrast, Ethereum and Bitcoin blockchains display performance metrics of 7 TPS and 30 TPS, respectively, with significantly higher latency than the BSV Blockchain. These performance metrics affirm the notable superiority of the proposed framework in terms of scalability. The production network (mainnet) of the BSV Blockchain currently achieves an approximate rate of 50,000 TPS, while the testing network (testnet) achieves around 100,000 TPS (source: bit.ly/3bwr7kA). The transaction cost, denoted as the rate per 1 byte of data in a transaction, is 0.5769 sat/Byte. Here, "sat" refers to Satoshi, which is the smallest unit of BSV. One BSV is equivalent to 100,000,000 Satoshis (1 Satoshi=0.00000001 BSV). Based on the current rate, the cost for 1 KB of data is estimated to be 0.000005907 BSV (~ 0.000361 USD) at the time of writing (source: wiki.bitcoinsv.io/index.php/Satoshis).

There is an urgent need for a comprehensive digital transformation in the field of academic credentials, ensuring independent authenticity that can be reliably proven. Blockchain technology offers promising solutions to address these challenges by introducing transparency and verifiability to the management of academic credentials. By leveraging the decentralized nature of Blockchain and incorporating Public Key Cryptography (PKC) in the form of Digital Signatures, the proposed solution aims to enhance the credibility and trustworthiness of academic credentials. The disclosed solution incorporates an attestation mechanism, which involves the validation and endorsement of credentials by trusted third-party entities. This process establishes an additional layer of trust and credibility by involving reputable organizations or individuals who can vouch for the authenticity and accuracy of the credentials. The attestation process ensures that the credentials are not only verified but also supported by authoritative entities, further bolstering their trustworthiness. Governing bodies like the Ministry of Education, can sign the credentials to provide additional endorsements, enhancing their credibility.

Employing Blockchain technology and the ECDSA algorithm, can revolutionize the management of academic credentials. The proposed solution addresses the limitations of the current paper-based system by offering complete transparency, tamper-proof storage, and verifiable proofs of ownership. Through decentralized storage and PKC-based digital signatures, the integrity and authenticity of credentials are strengthened, reducing the risk of fraud, and enhancing trust in the academic credentialing process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the invention, defined in scope by the following claims.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A method of authenticating credential data signed on a blockchain-based validation and authentication platform, the method being based on a computer readable medium storing machine-readable instructions which when executed by a hardware processor cause the hardware processor to:
   classify the credential data into a first class of data that is stored on a blockchain and a second class of data that is stored on a database, wherein the first class of data is a form of signed transactions data containing information about issued or signed credentials, and wherein the second class of data is non-transactional information related to the credential data;
   generate an ECDSA (Elliptic Curve Digital Signature) algorithm-based digital signature for the first class of credential data using a private key from an issuer;
   authenticate the credential data that is digitally signed via the ECDSA algorithm directly using a corresponding public key;
   store the credential data that is digitally signed securely by employing a classification of the credential data and storage of the credential data on a Blockchain and a database;
   digitally sign the credential data using cryptographic algorithms wherein a unique digital signature is generated for each credential data, for enabling authentication and integrity verification of each of the credential data;
   verify validity and accuracy of each of the credential data by cross-referencing each of the credential data with each unique digital signature that is generated and related metadata using one or more algorithms and the Blockchain; and
   attest to each of the credential data by trusted third-party entities and authoritative entities, vouching for accuracy and trustworthiness of one or more of the credential data.

2. The method of claim 1, wherein storing the credential data comprises storing the second class of data in a database and storing the first class of data, in a form of signed transactions, on the Blockchain configured such that the first class of data is tamper-proof and verifiable.

3. The method of claim 1, wherein the ECDSA algorithm-based digital signature uses the private key to digitally sign a cryptographic hash of the credential data and uses the public key to verify the ECDSA algorithm-based digital signature in combination with the cryptographic hash of the credential data which was signed.

4. The method of claim 1, wherein the ECDSA algorithm is implemented for signing the credential data by the issuer or an issuing party thereby embedding the ECDSA algorithm-based digital signature with the credential data.

5. The method of claim 4, wherein the ECDSA algorithm-based digital signature that is embedded remains alongside the credential data in JSON format.

6. The method of claim 1, wherein the private key and the corresponding public key are non-expiring and the corresponding public key is embedded in the credential data rather than being passed to a verifier or a third-party.

7. The method of claim 1, wherein the ECDSA algorithm-based digital signature is mathematically derived from a cryptographic hash of data to be signed and the private key and gives a resultant of two numbers, a "r" and a "s" value.

8. The method of claim 1, wherein the first class of data is encrypted using an Advanced Encryption Standard (AES) algorithm whereby the first class of data is masked into a pseudo-random string and is configured to be decrypted by the private key that is used in signing the ECDSA algorithm-based digital signature.

9. The method of claim 8, wherein the Advanced Encryption Standard (AES) algorithm is a military grade AES encryption algorithm.

10. One or more computer-readable media comprising instructions that cause a computer device, in response to execution of the instructions by one or more hardware processors of the computer device, to operate a blockchain-based validation and authentication platform to:

classify credential data into a first class of data that is stored on a blockchain and a second class of data that is stored on a database, wherein the first class of data is a form of signed transactions data containing information about issued or signed credentials, and wherein the second class of data is non-transactional information related to the credential data;

generate an ECDSA (Elliptic Curve Digital Signature) algorithm-based digital signature for the credential data using a private key from an issuer;

authenticate the credential data that is digitally signed via the ECDSA algorithm directly using a corresponding public key;

store the credential data that is digitally signed securely by employing a classification of the credential data and storage of the credential data on a Blockchain and a database;

digitally sign the credential data using cryptographic algorithms wherein a unique digital signature is generated for each credential data, for enabling authentication and integrity verification of each of the credential data;

verify validity and accuracy of each of the credential data by cross-referencing each of the credential data with each unique digital signature that is generated and related metadata using one or more algorithms and the Blockchain; and attest to each of the credential data by trusted third-party entities and authoritative entities, vouching for accuracy and trustworthiness of one or more of the credential data.

11. The computer-readable media of claim 10, wherein the ECDSA algorithm-based digital signature uses the private key to digitally sign a cryptographic hash of the credential data and uses the public key to verify the ECDSA algorithm-based digital signature in combination with the cryptographic hash of the credential data which was signed.

12. The computer-readable media of claim 10, wherein the ECDSA algorithm is implemented for signing credential data by the issuer or an issuing party thereby embedding the ECDSA algorithm-based digital signature with the credential data.

13. The computer-readable media of claim 12, wherein the ECDSA algorithm-based digital signature that is embedded remains alongside the credential data in JSON format.

14. The computer-readable media of claim 10, wherein the private key and the corresponding public key are non-expiring and the corresponding public key is embedded in the credential data rather than being passed to a verifier or a third-party.

15. A system for validating/authenticating academic credentials and facilitating equivalency between different credentials, the system comprising:

a distributed electronic memory data structure storing a blockchain, wherein the blockchain stores a first class of credential data that is signed and processes transactions;

a centralized electronic database server storing a second class of data, the second class of data being non-transactional data that is associated with the credential data; and a hardware processor configured to;

generate an ECDSA (Elliptic Curve Digital Signature) algorithm-based digital signature for the first class of credential data using a private key from an issuer;

authenticate the credential data that is digitally signed via the ECDSA algorithm directly using a corresponding public key;

store the credential data that is digitally signed securely by employing a classification of the credential data and storage of the credential data on the blockchain and the centralized electronic database server;

digitally sign the credential data using cryptographic algorithms wherein a unique digital signature is generated for each credential data, for enabling authentication and integrity verification of each of the credential data;

verify validity and accuracy of each of the credential data by cross-referencing each of the credential data with each unique digital signature that is generated and related metadata using one or more algorithms and the blockchain; and attest to each of the credential data by trusted third-party entities and authoritative entities, vouching for accuracy and trustworthiness of one or more of the credential data.

16. The system of claim 15, wherein the blockchain is a Bitcoin Satoshi Vision (BSV) blockchain.

17. The system of claim 15, wherein the first cryptographic algorithm is an Elliptic Curve cryptography (ECC)-based Elliptic Curve Digital Signature Algorithm (ECDSA).

18. The system of claim 15, wherein the second cryptographic algorithm is an Advanced Encryption Standard (AES) algorithm.

* * * * *